(12) United States Patent
Tang

(10) Patent No.: US 9,838,596 B2
(45) Date of Patent: Dec. 5, 2017

(54) METHOD AND SYSTEM FOR QUICKLY STARTING CAMERA BASED ON EYEPRINT IDENTIFICATION

(71) Applicant: JRD COMMUNICATION INC., Shenzhen (CN)

(72) Inventor: Xiangdong Tang, Shenzhen (CN)

(73) Assignee: JRD COMMUNICATION INC., Shenzhen (CN)

( * ) Notice: Subject to any disclaimer, the term of this patent is extended or adjusted under 35 U.S.C. 154(b) by 1 day.

(21) Appl. No.: 15/103,398

(22) PCT Filed: Apr. 30, 2015

(86) PCT No.: PCT/CN2015/096679
§ 371 (c)(1),
(2) Date: Jun. 10, 2016

(87) PCT Pub. No.: WO2016/173257
PCT Pub. Date: Nov. 3, 2016

(65) Prior Publication Data
US 2017/0126962 A1    May 4, 2017

(30) Foreign Application Priority Data
Apr. 30, 2015  (CN) .......................... 2015 1 0215525

(51) Int. Cl.
*H04N 5/232*  (2006.01)
*G06F 21/32*  (2013.01)
(Continued)

(52) U.S. Cl.
CPC ......... *H04N 5/23219* (2013.01); *G06F 21/32* (2013.01); *G06F 21/45* (2013.01);
(Continued)

(58) Field of Classification Search
CPC ...................... H04N 5/23219; H04N 5/23293; G06F 21/32; G06F 21/45; G06K 9/00604; G06K 9/00617; H04W 12/06; Y02B 60/50
See application file for complete search history.

(56) References Cited

U.S. PATENT DOCUMENTS

| | | | |
|---|---|---|---|
| 2009/0082066 A1* | 3/2009 | Katz | G06F 1/3203 455/566 |
| 2013/0102273 A1 | 4/2013 | Jung | |
| 2015/0009415 A1* | 1/2015 | Wong | G06F 3/0484 348/745 |

FOREIGN PATENT DOCUMENTS

| | | |
|---|---|---|
| CN | 103218142 A | 7/2013 |
| CN | 104065817 A | 9/2014 |
| CN | 104809384 A | 7/2015 |

* cited by examiner

Primary Examiner — Tuan Ho
(74) Attorney, Agent, or Firm — Shimokaji IP

(57) ABSTRACT

A method and a system for quickly starting a camera based on eyeprint recognition may include storing a camera initialization procedure for a power-up initializing camera of a mobile terminal in a singleton pattern class of the camera, and detecting whether the screen of the mobile terminal is illuminated or not; when it is detected that the mobile terminal screen is illuminated, directly acquiring the camera initialization procedure in the singleton pattern class to complete the power-up initializing of the camera, directly displaying an image captured by the camera while starting eyeprint recognition software, and acquiring a user's eye image to complete eyeprint unlocking.

20 Claims, 3 Drawing Sheets

(51) Int. Cl.
*G06F 21/45* (2013.01)
*G06K 9/00* (2006.01)
*H04W 12/06* (2009.01)

(52) U.S. Cl.
CPC ..... *G06K 9/00604* (2013.01); *G06K 9/00617* (2013.01); *H04N 5/23293* (2013.01); *H04W 12/06* (2013.01); *Y02B 60/50* (2013.01)

METHOD AND SYSTEM FOR QUICKLY STARTING CAMERA BASED ON EYEPRINT IDENTIFICATION

TECHNICAL FIELD

The present invention relates to the field of quickly starting a camera, and more particularly, to a method and system for quickly starting a camera of a mobile terminal based on eyeprint identification.

BACKGROUND

With the popularization of smart phones, many users utilize lock screen software to protect their privacy on their mobile phones, beautify their mobile phones, and reduce incorrect operation. Eyeprint recognition lock screen software is lock screen software for protecting privacy on users' mobile phones. Each person's eye texture may be different, and may be unlikely to change significantly. The eyeprint recognition lock screen software utilizes this principle to determine whether or not a user is an owner of the mobile phone by means of eyeprint analysis.

The procedures of the eyeprint recognition lock screen software may be as below: in using for the first time, the user may input his/her own eyeprint information, which may be similar to face recognition lock screen software. Also, an alternative unlocking method may need to be inputted. This may be because image recognition lock screen software may have a certain probability of failure in unlocking the screen. An alternative unlocking method, such as a password or nine-grid pattern, may be preset so that the alternative unlocking method is enabled once the eyeprint recognition is failed.

The eyeprint recognition lock screen software may be as follows: a plurality of eye images of the user may be acquired by using a front-facing camera, then data processing may be performed on these images to acquire the user's eyeprint information, and the eyeprint information may be stored in the mobile phone locally. When the user unlocks the mobile phone, the eyeprint recognition software may turn on the front-facing camera to reacquire the user's eyeprint information, and then it may be determined whether or not the user is the owner of the mobile phone by comparing the eyeprint recognition with the prestored eyeprint information.

The eyeprint recognition lock screen software may utilize a front-facing camera to acquire eye image information of the user, and then process and analyze the image data. Therefore, requirements for image quality from the front-facing camera may be relatively higher. Moreover, the software may be frequently used, thus the user may have higher requirements for speed. However, a certain starting time may be needed to start the front-facing camera, which may make the user experience not smooth, to the disadvantage of the user.

If the time from starting the front-facing camera to acquiring the first frame of an image can be shortened as much as possible, the eyeprint recognition speed can be accelerated and the user experience can be improved. One solution can be to improve the hardware technology of the front-facing camera and improve the CPU processing speed. However, it can be difficult to implement these means. In addition, cost and power consumption may be increased as well.

Therefore, the prior art needs to be improved and developed.

SUMMARY

In view of the foregoing disadvantages of the prior art, an objective of the present invention may be to provide a method and system for quickly starting a camera of a mobile terminal based on eyeprint identification and a mobile terminal, and the problem that the camera start-up and the software start-up during eyeprint recognition are not synchronous can be solved.

The technical solutions of the present invention are as below.

A method for quickly starting a camera of a mobile terminal based on eyeprint identification may include the following steps:

A: storing a camera initialization procedure f in a singleton pattern class of the camera of the mobile terminal;

B: detecting whether a screen of the mobile terminal is illuminated or not by using a passive trigger detection method or an active detection method or a real-time detection method;

C: if the mobile terminal screen is illuminated, directly acquiring, by using lock screen software, the camera initialization procedure for a power-up initializing camera in the singleton pattern class to complete the power-up initializing of the camera of the mobile terminal;

D: detecting whether a mobile terminal interface goes into an unlocking status, going to Step E and then Step F if the mobile terminal interface goes into the unlocking status, otherwise, bypassing step E to go to Step F;

E: capturing an image by using the camera of the mobile terminal, starting an eyeprint recognition software program to directly preview the image captured by the camera of the mobile terminal to acquire a user's eye image and complete eyeprint unlocking according to the acquired user's eye image; and F: turning off the camera of the mobile terminal.

Further, in Step D, a specific method for detecting whether or not a mobile terminal interface goes into an unlocking status may include:

D1: detecting whether a sliding screen unlocking event occurs in the mobile terminal interface, and going to Step D2 if the sliding screen unlocking event occurs in the mobile terminal interface, or the mobile terminal interface may be in a lock screen status if no sliding screen unlocking event occurs in the mobile terminal interface; and D2: determining whether the sliding screen unlocking event succeeds, the mobile terminal interface entering into the unlocking status if the sliding screen unlocking event succeeds, otherwise the mobile terminal interface may be in the lock screen status.

The present invention further provides a method for quickly starting a camera of a mobile terminal based on eyeprint identification, including the following steps:

A: storing a camera initialization procedure in a singleton pattern class of the camera of the mobile terminal, and detecting whether a screen of the mobile terminal is illuminated or not;

B: when it is detected that the mobile terminal screen is illuminated, directly acquiring the camera initialization procedure in the singleton pattern class to complete the power-up initializing of the camera of the mobile terminal;

C: directly displaying an image captured by the camera of the mobile terminal while starting eyeprint recognition software, and acquiring a user's eye image to complete eyeprint unlocking.

Step B may further include:

when it is detected that the mobile terminal screen is illuminated, continuing to detect whether a sliding screen unlocking event occurs in a mobile terminal interface.

Step B may include:

B1: determining whether the mobile terminal goes into an unlocking status or not.

After Step B1, the method may further include B2:

when the mobile terminal goes into the unlocking status by means of the sliding screen unlocking event, starting eyeprint recognition preview to display an image captured by the camera of the mobile terminal; and turning the camera of the mobile terminal off when the mobile terminal does not go into the unlocking status or unlocking is given up.

The present invention may further provide a system for quickly starting a camera of a mobile terminal based on eyeprint identification, including:

a detecting module, configured to store a camera initialization procedure in a singleton pattern class of the camera of the mobile terminal, and detect whether a screen of the mobile terminal is illuminated or not;

a starting module, configured to directly acquire the camera initialization procedure in the singleton pattern class to complete the power-up initializing of the camera of the mobile terminal when it is detected that the mobile terminal screen is illuminated;

an unlocking module, configured to directly display an image captured by the camera of the mobile terminal while starting eyeprint recognition software, and acquire a user's eye image to complete eyeprint unlocking.

The detecting module may be further configured to continue detecting whether a sliding screen unlocking event occurs in a mobile terminal interface or not when it is detected that the mobile terminal screen is illuminated.

The starting module may be further configured to determine whether the mobile terminal goes into an unlocking status or not.

The starting module may be further configured to start eyeprint recognition preview to display the image captured by the camera of the mobile terminal when the mobile terminal goes into the unlocking status by means of the sliding screen unlocking event, and turn the camera of the mobile terminal off when the mobile terminal does not go into the unlocking status or unlocking is given up by the user.

Furthermore there is provided a mobile terminal including the foregoing system for quickly starting a camera of a mobile terminal based on eyeprint recognition.

In the method and system for quickly starting the camera of the mobile terminal based on eyeprint recognition and the mobile terminal provided by the present invention, it may be detected whether the screen of the mobile terminal is illuminated or not, the camera of the mobile terminal may be turned on to complete the power-up of the camera of the mobile terminal when it is detected that the mobile terminal screen is illuminated, and the camera initialization procedure may be stored in a singleton pattern class. An image captured by the camera of the mobile terminal may be directly displayed when the eyeprint recognition software is started, and a user's eye image may be acquired to complete eyeprint unlocking. In this way, the problem that camera start-up and software start-up during eyeprint recognition are not synchronous may be solved on the basis of not increasing the CPU processing speed, cost or power consumption of the mobile terminal.

DETAILED DESCRIPTION OF THE EMBODIMENTS

The present invention provides a method and system for quickly starting a camera of a mobile terminal based on eyeprint recognition and a mobile terminal. To make the objectives, technical solutions, and effects of the present invention clearer and more explicit, the following further describes in detail the present invention with reference to the accompanying drawings and embodiments. It is to be understood that the embodiments described herein are only intended to explain the present invention, and are not restrictive of the present invention.

Figure 1:
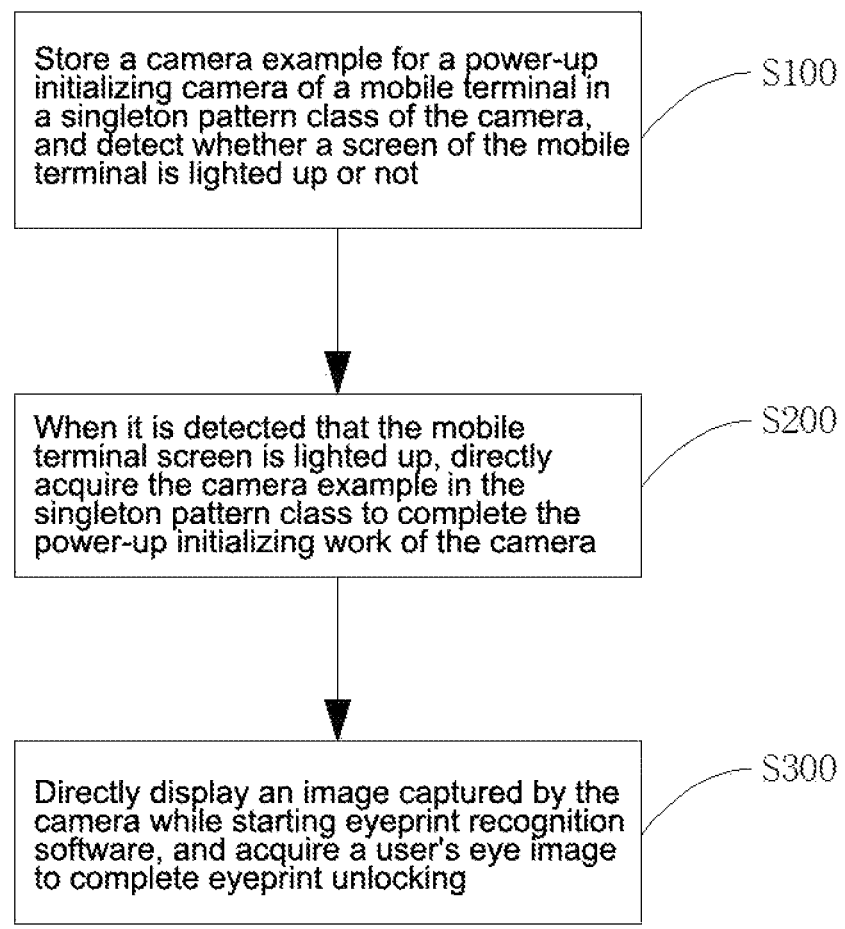
FIG. 1 is a flowchart of a method for quickly starting a camera of a mobile terminal based on eyeprint recognition according to the present invention.

As shown in FIG. 1, by using the method for quickly starting a camera of a mobile terminal based on eyeprint recognition provided by the present invention, the problem that camera start-up and software start-up during eyeprint recognition are not synchronous may be solved on the basis of not increasing the CPU processing speed, cost or power consumption of the mobile terminal. The eyeprint recognition lock screen software may utilize a front-facing camera to acquire eye image information of the user, and then process and analyze the image data. Therefore, requirements for image quality from the front-facing camera may be relatively higher. Moreover, the software may be frequently used, thus the user may have higher requirements for speed. The time spent in turning on the front-facing camera may be about 250 ms; with the addition of parameter configuration, nearly 1s may be needed until the first frame of an image is displayed, that is, it may need nearly 1 s for the user to see the image, which may cause the problem that the camera start-up and the software start-up are not synchronous.

Generally, the processes of a conventional camera may be as below:

open( ) a camera initialization procedure is acquired via an open method; at this time, powering-on the conventional camera or some system initialization operations may be conducted;

setPreviewDisplay(SurfaceHolder): set preview display;

startPreview( ) start preview, from this stage on, the user may start to see images;

stopPreview( ) stop preview;

release( ) release the camera initialization procedure; and takePicture(camera.ShutterCallback shutter, camera.PictureCallback raw, camera.PictureCallback jpeg): a method to be executed for taking pictures, including three callback parameters. Shutter may be a callback when the shutter is pressed down, raw may be a callback for acquiring raw data for taking pictures, and jpeg may be a callback for acquiring image data compressed into a jpg format.

When eyeprint lock screen software or face recognition software is used for unlocking, the screen may need to be started and then slided for unlocking by going into the unlocking software. The unlocking software may turn the camera of the mobile terminal on, then configure parameters, and finally acquire data, which is a serial process and needs about 1 s. Before the user sees the first frame of an image from the camera of the mobile terminal, the unlocking software may appear a phenomenon of stagnation.

The present invention may adopt the following method to solve the foregoing problem.

S100: Store a camera initialization procedure of a mobile terminal in a singleton pattern class of the conventional camera, and detect whether a screen of the mobile terminal is illuminated or not.

Namely, first the camera of the mobile terminal can be turned on, then the power-up initializing of the camera of the mobile terminal can be completed, and then an example initialization procedure of starting the foregoing camera cameral of the mobile terminal can be utilized. The example initialization procedure for starting the camera of the mobile terminal can be prestored in a singleton pattern class, and the camera of the mobile terminal in the singleton pattern class may be directly acquired when the lock screen software starts to work, so that the camera of the mobile terminal does not need to be reinitialized.

The singleton pattern may be a frequently-used software design pattern. A core structure may only contain a special class referred to as a singleton class. By means of the singleton pattern, it may be ensured that one class in the system only contains one example of an initialization procedure and the example is easily accessible by the outside, thereby facilitating control of the number of examples and saving the system resources.

Step S200: When it is detected that the mobile terminal screen is illuminated, directly acquire the camera initialization procedure in the singleton pattern class to complete the power-up initializing of the camera of the mobile terminal. Namely, the system may detect whether the mobile terminal screen is illuminated or not by using a passive trigger detection method or an active detection method or a real-time detection method. When it is detected that the mobile terminal screen is illuminated, this may mean that the user needs to unlock the mobile terminal; the camera of the mobile terminal may be started in advance to save the time for starting the camera of the mobile terminal, namely, the front-facing camera of the mobile terminal may be turned on to complete initialization of the camera of the mobile terminal such as power-up and parameter configuration and so on so that the difference between the time for starting the camera of the mobile terminal and the time for starting the unlocking software is small enough.

S300: Directly display an image captured by the camera of the mobile terminal while starting eyeprint recognition software, and acquire a user's eye image to complete eyeprint unlocking.

The initialization procedure of the foregoing camera may be saved in a singleton pattern class, and the camera of the mobile terminal in the singleton pattern class may be directly acquired when the lock screen software starts to work, so that the camera of the mobile terminal may not need to be reinitialized because the initialization procedure of the camera of the mobile terminal may be directly used to start preview (start image capture). The user may observe that an image is displayed immediately after the software is started, thereby solving the phenomenon of stagnation. Also, this may accelerate the unlocking process because the eyeprint unlocking software may more quickly acquire an eye image. Namely, the problem that the camera start-up and the software start-up during eyeprint recognition are not synchronous may be solved without increasing the CPU processing speed, cost or power consumption of the mobile terminal.

In the foregoing embodiments, when the system detects that the mobile terminal screen is illuminated, the user may not unlock the mobile terminal, but check the time, check missed calls or check messages, for example. In this case, the mobile phone resources and power may be wasted if the camera of the mobile terminal is started. Therefore, the foregoing Step S100 may further include: when it is detected that the mobile terminal screen is illuminated, continuing to detect whether a sliding screen unlocking event occurs in a mobile terminal interface or not. That is, after it is detected that the mobile terminal screen is illuminated, it may be further detected whether or not a sliding screen unlocking event occurs in a mobile terminal interface to further confirm whether the user desires to unlock the mobile terminal or not.

Further, after the Step S200, a detection step corresponding to the Step S100 may further include: deciding whether the mobile terminal goes into an unlocking status or not, starting eyeprint recognition preview to display the image captured by the camera of the mobile terminal when the mobile terminal goes into the unlocking status by means of the sliding screen unlocking event, or turning the camera of the mobile terminal off when the mobile terminal does not go into the unlocking status (namely, the sliding screen unlocking event fails) or unlocking is given up (namely, the user does not proceed with the sliding screen unlocking event).

The eyeprint unlocking may be started after the user slides the mobile terminal screen for unlocking. Therefore, it may be determined whether or not the sliding screen unlocking event occurs in the mobile terminal interface. Only after it is detected that the mobile terminal screen is illuminated and the sliding screen unlocking event occurs may the system continue determining whether or not the mobile terminal goes into the eyeprint unlocking status. After the mobile terminal is unlocked by means of the sliding screen unlocking event of the mobile terminal and goes into the eyeprint unlocking process, the system may start, according to the eyeprint recognition software program, the eyeprint recognition preview to display the image captured by the front-facing camera of the mobile terminal, and then continue executing the eyeprint unlocking process until the unlocking is completed to go into the mobile terminal operation interface. The camera of the mobile terminal may be turned off if the sliding screen unlocking event of the mobile terminal fails or the user stops pursuing the unlocking event.

Figure 2:
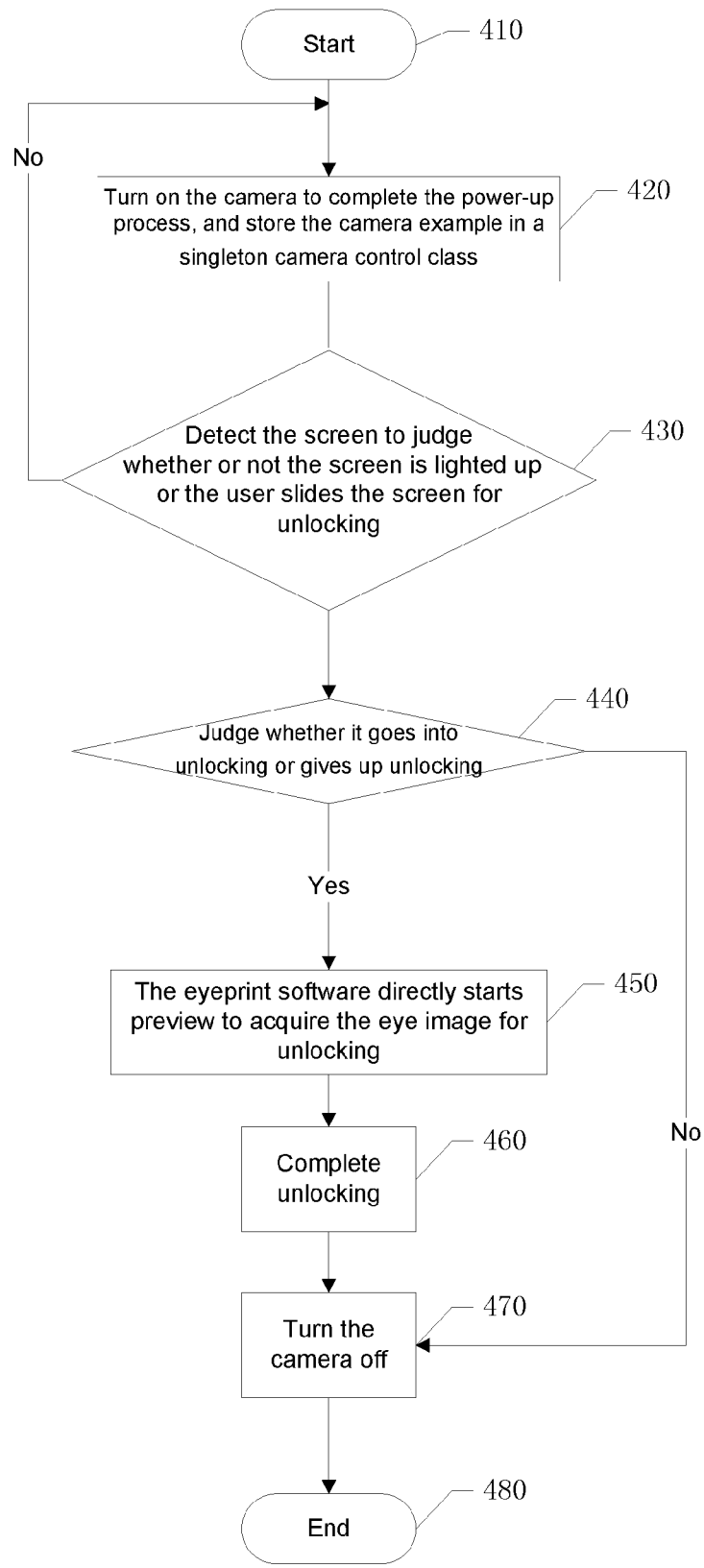
FIG. 2 is a work flowchart of a method for quickly starting a camera of a mobile terminal based on eyeprint recognition according to the present invention.

FIG. 2 is a work flowchart of a method for quickly starting a camera of a mobile terminal based on eyeprint recognition according to the present invention. The following further describes the present invention with reference to a work flowchart of the method according to the present invention.

S410: Start;

S420: Turn on the camera of the mobile terminal to complete the power-up process, and store the camera initialization procedure in a singleton camera control class;

S430: Detect the screen to determine whether or not the screen is illuminated or the user slides the screen for unlocking, and execute Step S440 if so, otherwise return to Step S410;

S440: Determine whether to execute Step S450 and Step S460, otherwise execute Step S470;

S450: The eyeprint software may directly start preview to acquire the eye image for unlocking, namely, the eyeprint recognition software may run to capture via the camera an image and preview the image, and then acquire the user's eye image for unlocking;

S460: Complete unlocking;

S470: Turn the camera of the mobile terminal off; and

S480: End.

By using the method for quickly starting the camera of the mobile terminal based on eyeprint recognition provided by the present invention, the problem that the camera start-up and the software start-up during eyeprint recognition are not synchronous may be solved without increasing the CPU processing speed, cost or power consumption of the mobile terminal.

Figure 3:
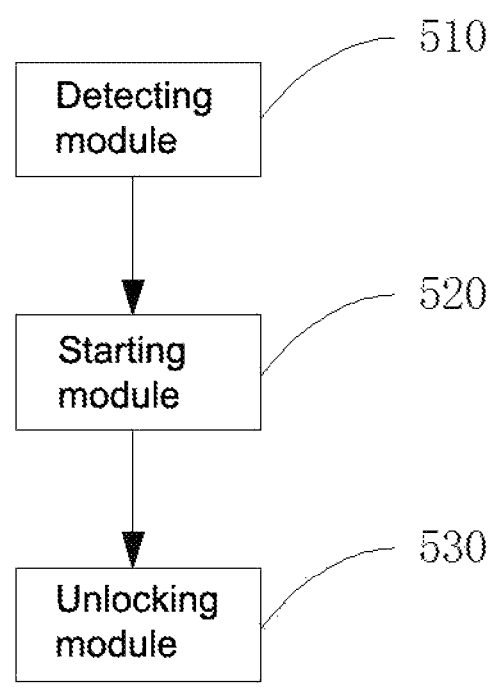
FIG. 3 is a module block diagram of a system for quickly starting a camera of a mobile terminal based on eyeprint recognition according to the present invention.

FIG. 3 illustrates a system for quickly starting a camera of a mobile terminal based on eyeprint identification, including:

a detecting module 510, configured to store a camera initialization procedure for a power-up initializing camera of a mobile terminal in a singleton pattern class of the camera of the mobile terminal, and detect whether a screen of the mobile terminal is illuminated or not;

a starting module 520, configured to directly acquire the camera initialization procedure in the singleton pattern class to complete the power-up initializing of the camera of the mobile terminal when it is detected that the mobile terminal screen is illuminated; and an unlocking module 530, configured to directly display an image captured by the camera of the mobile terminal while starting eyeprint recognition software, and acquire a user's eye image to complete eyeprint unlocking, specifically as mentioned above.

The detecting module 510 may be further configured to continue detecting whether or not a sliding screen unlocking event occurs in a mobile terminal interface when it is detected that the mobile terminal screen is illuminated.

The starting module 520 may be further configured to determine whether the mobile terminal goes into an unlocking status or not.

The starting module 530 may be further configured to start eyeprint recognition preview to display the image captured by the camera of the mobile terminal when the mobile terminal goes into the unlocking status by means of the sliding screen unlocking event, and turn the camera of the mobile terminal off when the mobile terminal does not go into the unlocking status or unlocking is stopped.

The present invention further provides a mobile terminal including the foregoing system for quickly starting the camera of the mobile terminal based on eyeprint recognition.

In the method and system for quickly starting the camera of the mobile terminal based on eyeprint recognition and the mobile terminal provided by the present invention, it may be detected whether the screen of the mobile terminal is illuminated or not, the camera of the mobile terminal may be turned on to complete the power-up of the camera of the mobile terminal when it is detected that the mobile terminal screen is illuminated, and the camera initialization procedure may be stored in a singleton pattern class. An image captured by the camera of the mobile terminal may be directly displayed when the eyeprint recognition software is started, and a user's eye image may be acquired to complete eyeprint unlocking. In this way, the problem that the camera start-up and the software start-up during eyeprint recognition are not synchronous may be solved without increasing the CPU processing speed, cost or power consumption of the mobile terminal.

It is to be understood that application of the present invention is not limited to the foregoing examples, those of ordinary skill in the art may make improvements or transformations according to the foregoing description, and all these improvements and transformations should fall within the scope of protection of the appended claims of the present invention.

The invention claimed is:

1. A method for quickly starting a camera of a mobile terminal based on eyeprint recognition, comprising:

storing a camera initialization procedure in a singleton pattern class of the camera of the mobile terminal;

detecting whether a screen of the camera of the mobile terminal is illuminated or not by using a passive trigger detection method or an active detection method or a real-time detection method;

if the mobile terminal screen is illuminated, directly capturing, by using lock screen software, the camera initialization procedure in the singleton pattern class to complete power-up initializing of the camera of the mobile terminal;

detecting whether a mobile terminal interface goes into an unlocking status;

in response to the mobile terminal interface going into the unlocking status, capturing an image by using the camera of the mobile terminal, starting an eyeprint recognition software program to directly preview the image captured by the camera of the mobile terminal to acquire a user's eye image and complete eyeprint unlocking according to the acquired user's eye image; and turning off the camera of the mobile terminal.

2. The method for quickly starting the camera of the mobile terminal based on eyeprint recognition according to claim 1, wherein detecting whether a mobile terminal interface goes into an unlocking status includes:

detecting whether a sliding screen unlocking event occurs in the mobile terminal interface; and in response to the sliding screen unlocking event occurring in the mobile terminal interface, determining whether the sliding screen unlocking event succeeds, the mobile terminal interface entering into the unlocking status if the sliding screen unlocking event succeeds, otherwise the mobile terminal interface is in the lock screen status.

3. A method for quickly starting a camera of a mobile terminal based on eyeprint recognition, comprising:

storing a camera initialization procedure of the mobile terminal in a singleton pattern class of the camera of the mobile terminal, and detecting whether a screen of the mobile terminal is illuminated or not;

when it is detected that the mobile terminal screen is illuminated, directly acquiring the camera initialization procedure in the singleton pattern class to complete the power-up initializing of the camera of the mobile terminal;

displaying an image captured by the camera of the mobile terminal while starting eyeprint recognition software, and acquiring a user's eye image to complete eyeprint unlocking.

4. The method for quickly starting a camera of the mobile terminal based on eyeprint recognition according to claim 3 further including:

when it is detected that the mobile terminal screen is illuminated, continuing to detect whether a sliding screen unlocking event occurs in the mobile terminal interface.

5. The method for quickly starting the camera of the mobile terminal based on eyeprint recognition according to claim 4, including:
determining whether the mobile terminal goes into an unlocking status or not.

6. The method for quickly starting the camera of the mobile terminal based on eyeprint recognition according to claim 5, including:
in response to the mobile terminal going into the unlocking status by means of the sliding screen unlocking event, starting an eyeprint recognition preview to display an image captured by the camera of the mobile terminal; and turning the camera of the mobile terminal off when the mobile terminal does not go into the unlocking status or unlocking is stopped.

7. A system for quickly starting a camera of a mobile terminal based on eyeprint recognition, comprising:
a detecting module, configured to store a camera initialization procedure in a singleton pattern class of the camera of the mobile terminal, and detect whether a screen of the mobile terminal is illuminated or not;
a starting module, configured to directly acquire the camera initialization procedure in the singleton pattern class to complete power-up initializing of the camera of the mobile terminal when it is detected that the mobile terminal screen is illuminated;
an unlocking module, configured to directly display an image captured by the camera of the mobile terminal while starting eyeprint recognition software, and acquire a user's eye image to complete eyeprint unlocking.

8. The system for quickly starting the camera of the mobile terminal based on eyeprint recognition according to claim 7, wherein the detecting module is further configured to continue detecting whether or not a sliding screen unlocking event occurs in the mobile terminal screen when it is detected that the mobile terminal screen is illuminated.

9. The system for quickly starting the camera of the mobile terminal based on eyeprint recognition according to claim 7, wherein the starting module is further configured to determine whether the mobile terminal goes into an unlocking status.

10. The system for quickly starting the camera of the mobile terminal based on eyeprint recognition according to claim 9, wherein the starting module is further configured to start an eyeprint recognition preview to display the image captured by the camera of the mobile terminal when the mobile terminal goes into the unlocking status by means of the sliding screen unlocking event, and turn the camera of the mobile teminal off when the mobile terminal does not go into the unlocking status or unlocking is stopped.

11. The method of claim 1, wherein an alternate password is activated in response to a failure of the system to unlock the mobile terminal with the first password.

12. The method of claim 1, wherein the camera of the mobile terminal is a front-facing camera.

13. The method of claim 1, wherein unlocking begins after the user slides the mobile terminal screen for unlocking.

14. The method of claim 1, wherein the camera of the mobile terminal turns off in the event the sliding screen unlocking event fails.

15. The method of claim 3, wherein an alternate password is activated in response to a failure of the system to unlock the mobile terminal with the first password.

16. The method of claim 3, wherein unlocking begins after the user slides the mobile terminal screen for unlocking.

17. The method of claim 3, wherein the camera of the mobile terminal is a front-facing camera.

18. The system of claim 7, wherein an alternate password is activated in response to a failure of the system to unlock the mobile terminal with the first password.

19. The system of claim 7, wherein the camera of the mobile terminal is a front facing camera.

20. The system of claim 7, wherein unlocking begins after the user slides the mobile terminal screen for unlocking.

* * * * *